United States Patent [19]

Kanbayashi et al.

[11] Patent Number: 5,230,731
[45] Date of Patent: Jul. 27, 1993

[54] HOT-MELT INK COMPOSITION

[75] Inventors: Kenichi Kanbayashi; Makoto Matsuzaki; Fumiyuki Kanai; Fumie Uehara; Ikuko Kawakami, all of Suwa, Japan

[73] Assignee: Seiko Epson Corporation, Tokyo, Japan

[21] Appl. No.: 755,333

[22] Filed: Sep. 5, 1991

[30] Foreign Application Priority Data

Sep. 10, 1990 [JP] Japan ................ 2-239251
Sep. 11, 1990 [JP] Japan ................ 2-240595
Sep. 12, 1990 [JP] Japan ................ 2-242001
Sep. 17, 1990 [JP] Japan ................ 2-246525
Sep. 17, 1990 [JP] Japan ................ 2-246526

[51] Int. Cl.$^5$ ............................ C09D 11/02
[52] U.S. Cl. ................ 106/20 D; 106/22 A; 106/30 R
[58] Field of Search .............. 106/20, 22, 30, 31

[56] References Cited

U.S. PATENT DOCUMENTS

| | | | |
|---|---|---|---|
| 4,484,948 | 11/1984 | Merritt et al. | 106/27 |
| 4,659,383 | 4/1987 | Lin et al. | 106/27 |
| 4,820,346 | 4/1989 | Nowak | 106/20 |
| 4,878,946 | 11/1989 | Tabayashi et al. | 106/20 R |
| 5,080,716 | 1/1992 | Aoki et al. | 106/20 |

FOREIGN PATENT DOCUMENTS 0206286 12/1986 European Pat. Off.
0315406 5/1989 European Pat. Off.

Primary Examiner—Mark L. Bell
Assistant Examiner—Helene Klemanski
Attorney, Agent, or Firm—Ladas & Parry

[57] ABSTRACT

A hot-melt ink composition for an ink jet printer, comprising a coloring agent, and a vehicle which comprises a dialkylbenzenesulfonamide, a monoalkylbenzenesulfonamide, and a resin; and a hot-melt ink composition comprising from 10 to 30 wt. % of a coloring agent, and a vehicle. These ink compositions can produce high quality images which have improved resistance to abrasion and are free from blooming.

19 Claims, 1 Drawing Sheet

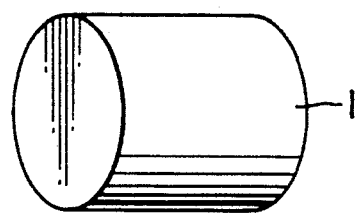
F I G. 1(a)
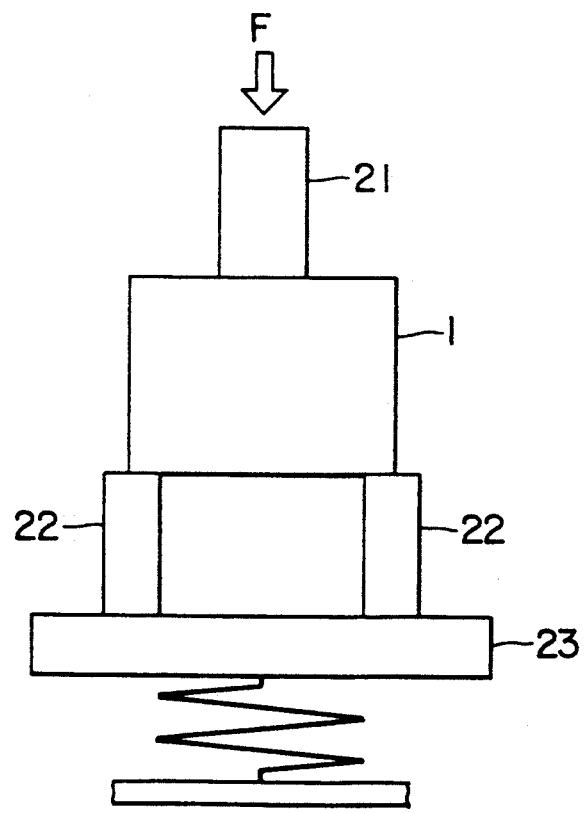
F I G. 1(b)

HOT-MELT INK COMPOSITION

BACKGROUND OF THE INVENTION

1. Field of the Invention

This invention relates to an ink composition for an ink jet printer, and more particularly to a hot-melt ink composition which is solid at room temperature and is suitable for ink jet printing conducted at temperatures higher than room temperature.

2. Description of the Related Art

An ink jet printing method can achieve high speed printing without making a noise. Liquid ink compositions containing water or the like as their vehicle have been used with the ink jet printing method. In the case of printing using an aqueous ink composition, the ink composition soaks into recording paper to produce an image therein. Therefore, when paper into which the ink composition readily soaks is employed as recording paper, the ink composition tends to spread in the paper after printing. As a result, printed ink dots are blurred and their sharpness is lost, resulting in deterioration of the quality of a printed image.

To obtain a high quality image on recording paper independently of the quality of the paper, hot-melt ink compositions comprising as a vehicle a wax or the like which is solid at room temperature have been proposed as disclosed in U.S. Pat. Nos. 4,390,369, 4,484,948 and 4,659,383, and Japanese Patent Laid-Open Publication No. 58-108271. These ink compositions are solid at room temperature. When conducting printing, they are fused by heat, and droplets of the fused ink compositions are ejected onto recording paper. The droplets are then cooled and solidified, thereby forming ink dots on the recording paper. Such an ink jet printing method is called a hot-melt ink jet printing method.

The above hot-melt ink compositions, however, are inferior to the conventional aqueous ink compositions in preservation and handling of printed documents. This is because dots of the hot-melt ink compositions printed on recording paper are poor in resistance to abrasion, that is, they are readily abraded or deformed when frictional force or pressure is applied thereto.

In order to solve the above problem, there has been proposed a hot-melt ink composition comprising solid organic solvents, mainly a monoalkylbenzenesulfonamide, and a thermosetting resin having a hydroxyl number of 50 or more and an acid number of 10 or less, as disclosed in U.S. Pat. No. 4,820,346 and Japanese Patent Laid-Open Publication No. 62-48774.

The above hot-melt ink composition is capable of producing an image with improved resistance to abrasion as compared with those hot-melt ink compositions which contain as a main component a natural wax. However, the abrasion resistance of printed dots of the above ink composition is still unsatisfactory when compared with that of printed dots formed by an electrophotographic method which is now superseding other conventional printing methods. Printed documents such as official documents are now required to have higher quality than ever, so that improvement in abrasion resistance of a printed image seems to be one important object.

When conducting printing, a hot-melt ink composition, which is solid at room temperature, is placed in a printer, and then fused. After completion of the printing, the ink composition is cooled, and solidified. Since the hot-melt ink composition is exposed to the above cycle, it tends to undergo thermal deterioration which is caused by a polymerization reaction, change in properties by heat, or the like. As a result, some troubles arise, for instance, the life of the ink composition is shortened, and a head nozzle of the printer gets clogged by the ink composition solidified due to change in properties.

In addition, the hot-melt ink composition comprising as its main component a monoalkylbenzenesulfonamide, in particular, ortho-toluenesulfonamide, gives rise to, with the passage of time, a phenomenon in which the surfaces of printed dots of the ink composition seem to be covered with white powder (hereinafter referred to as "blooming"). This phenomenon makes the printed image look poor.

SUMMARY OF THE INVENTION

Accordingly, an object of the present invention is to provide a hot-melt ink composition capable of producing a high quality image which consists of printed dots having improved resistance to abrasion.

A further object of the present invention is to provide a hot-melt ink composition having improved heat resistance.

A further object of the present invention is to provide a hot-melt ink composition capable of producing a high quality image which is free from blooming.

According to a first aspect of the present invention we provide a hot-melt ink composition comprising a coloring agent, and a vehicle which comprises (i) a dialkylbenzenesulfonamide, (ii) a monoalkylbenzenesulfonamide and (iii) a resin.

According to a second aspect of the present invention we provide a hot-melt ink composition comprising (a) from 10 to 30 wt. % of a coloring agent, and (b) a vehicle.

It was unexpectedly found that abrasion resistance of a printed image can be greatly improved when both a monoalkylbenzenesulfonamide and a dialkylbenzenesulfonamide are incorporated into a hot-melt ink composition.

Also, unexpectedly found was that blooming of a printed image can be prevented when a specific amount of a coloring agent is incorporated into a hot-melting ink composition comprising as its main component an alkylbenzenesulfonamide.

BRIEF DESCRIPTION OF THE DRAWINGS

A more complete appreciation of the invention and many of the attendant advantages thereof will be readily obtained as the same becomes better understood by reference to the, following detailed description when considered in connection with the accompanying drawings, wherein:

FIG. 1 (*a*) is a diagrammatic view showing a pellet of the ink composition which was used for the measurements of the shear strength and the elongation; and FIG. 1 (*b*) is an illustration showing the compression tester which was used for the measurements of the shear strength and the elongation.

DETAILED DESCRIPTION OF THE PREFERRED EMBODIMENTS

The vehicle for use in the hot-melt ink composition according to the present invention comprises (i) a dialkylbenzenesulfonamide, (ii) a monoalkylbenzenesulfonamide, and (iii) a resin.

Alkyl groups contained in the dialkylbenzenesulfonamide, which is one of the components of the present invention, may be linear or branched, and have preferably 1 to 5, more preferably 1 or 2, carbon atoms. The alkyl groups can be substituted at any position; however, 2,4-, 2,5- and 3,4-substitution products are preferred. The two alkyl groups may be the same or different, but it is preferable that they be the same. In the present invention, a mixture of a plurality of dialkylbenzenesulfonamides is also usable as the dialkylbenzenesulfonamide.

The mechanical strength of the ink composition itself, which affects abrasion resistance of a printed image, can be largely increased by the incorporation of the dialkylbenzenesulfonamide. While the mechanism of the improvement in the mechanical strength is not clear, the considerable reason for the increase in the mechanical strength is interaction between the dialkylbenzenesulfonamide and the monoalkylbenzenesulfonamide coexisting therewith, such as, hydrogen bond, intermolecular force (van der Waals' force), and stereostructural tangling, which are existing between molecules of the above two alkylbenzenesulfonamides. This can also be presumed from the fact that the mechanical strength of a hot-melt ink composition which comprises a dialkylbenzenesulfonamide but comprises no monoalkylbenzenesulfonamide was not effectively improved.

Those dialkylbenzenesulfonamides which contain alkyl groups having more than 5 carbon atoms are not preferable. This is because they tend to induce steric hindrance, so that the effective hydrogen bonding force or van der Waals' force between molecules thereof are reduced when the molecules are close to each other. Alkylbenzenesulfonamides having 3 or more alkyl groups are also unfavorable in the present invention, because they cause steric hindrance, which enlarges the distance between molecules thereof.

It is preferable that the vehicle comprise approximately 5 to 40 wt. % of the dialkylbenzenesulfonamide. When the vehicle comprises less than 5 wt. %, or more than 40 wt. % of the dialkylbenzenesulfonamide, the interaction between molecules, which brings about improvement in the mechanical strength of the ink composition, cannot be satisfactorily obtained.

Examples of the dialkylbenzenesulfonamide preferably usable in the present invention include the following compounds:

3,4-dimethylbenzenesulfonamide (3,4-dimethyl-BSA), 2,4-dimethylbenzenesulfonamide (2,4-dimethyl-BSA), 2,5-dimethylbenzenesulfonamide (2,5-dimethyl-BSA), 2,4-diethylbenzenesulfonamide (2,4-diethyl-BSA), 2,4-dibutylbenzenesulfonamide (2,4-dibutyl-BSA), 3,4-dipentylbenzenesulfonamide (3,4-dipentyl-BSA), and 3,4-dihexylbenzenesulfonamide (3,4-dihexyl-BSA), An alkyl group contained in the monoalkylbenzenesulfonamide, which is one of the components of the present invention, may also be linear or branched, and has preferably 1 to 4, more preferably 1 or 2, carbon atoms. The alkyl group can be substituted at any position; however, it is preferable that the alkyl group be at the para-position in terms of a sulfonamide group. A mixture of a plurality of monoalkylbenzenesulfonamides is also usable as the monoalkylbenzenesulfonamide.

It is preferable that the vehicle comprise approximately 50 to 85 wt. % of the monoalkylbenzenesulfonamide.

Examples of the monoalkylbenzenesulfonamide preferably usable in the present invention include the following compounds:

4-methylbenzenesulfonamide (p-toluenesulfonamide, p-TSA), 4-ethylbenzenesulfonamide (p-ethylbenzenesulfonamide, p-EBSA), 4-propylbenzenesulfonamide (p-propylbenzenesulfonamide, p-PBSA), and 4-n-butylbenzenesulfonamide (p-butylbenzenesulfonamide, p-n-BBSA), A mixture of a plurality of monoalkylbenzenesulfonamides can be incorporated into the vehicle as the monoalkylbenzenesulfonamide. The various properties of the ink composition can be improved when such a mixture is employed. For instance, when a mixture of 4-methylbenzenesulfonamide and 4-ethylbenzenesulfonamide is used, the resulting ink composition can have a mechanical strength higher than that of an ink composition prepared by using only 4-methylbenzenesulfonamide as the monoalkylbenzenesulfonamide in the same amount as that of the mixture. In the above case, it is preferable that the vehicle contain approximately 20 to 60 wt. % of the 4-ethylbenzenesulfonamide.

The hot-melt ink composition of the present invention may further comprise a 4n-$C_{3-9}$ alkylbenzenesulfonamide. Such an alkylbenzenesulfonamide can contribute to further improvement in the mechanical strength of the ink composition.

Any resin which is compatible with the dialkylbenzenesulfonamide and monoalkylbenzenesulfonamide is usable as the resin, which is one of the components of the present invention. However, those resins which have a melting point or softening point of 50° C. or higher are preferably employed in the present invention because they can impart high preservability to a printed image.

According to another embodiment of the present invention, those resins which have a hydroxyl number of 50 or less are preferable from the viewpoint of the mechanical strength of the ink composition. More preferred ones are those having a hydroxyl number of 50 or less, and an acid number of 10 or more.

According to yet another embodiment of the present invention, those resins which have an acid number of 10 or more are preferred from the viewpoint of the mechanical strength of the ink composition. More preferred ones are those having an acid number of 10 or more, and a hydroxyl number of 100 or more.

It is not clear how the resin having an acid number and/or hydroxyl number which are in the above respective ranges can improve the mechanical strength of the ink composition. However, it can be presumed that the above specific resin increases the efficiency of hydrogen bonding between the dialkylbenzenesulfonamide and a carboxyl or hydroxyl end group of the resin, thereby enhancing the mechanical strength of the ink composition. It is noted that the mechanical strength of the ink composition was not improved when the resin was incorporated into a hot-melt ink composition comprising no dialkylbenzenesulfonamide but comprising as a main component a monoalkylbenzenesulfonamide.

The acid number and hydroxyl number are characteristic numbers of the resin. The acid number refers to the number of carboxyl end groups contained in a unit quantity of the resin, and the hydroxyl number refers to the number of hydroxyl end groups contained in a unit quantity of the resin. The hydroxyl numbers and acid numbers which will be described hereinafter are the ones measured in accordance with JIS (Japanese Industrial Standard) K1557-1970 and JIS K0070-1966, respectively.

According to the other embodiment of the present invention, it is preferable to use a resin having a weight-average molecular weight of 10,000 or more, and a number-average molecular weight of 3,600 or more. When such a resin is used, the resulting ink composition has extremely high resistance to thermal deterioration. It is, in general, considered that thermal deterioration of a hot-melt ink composition is caused when a resin contained therein is exposed to high temperatures and undergoes the following complicated changes: decrease in the melting point of the resin due to cleavage of a polymer chain of the resin, change in color of the resin due to an oxidization reaction or the like, and change in molecular weight and molecular structure of the resin due to a crosslinking reaction. The above can be observed by monitoring the change in molecular weight of the resin with time. Namely, it can be confirmed that the molecular weight of the resin shifts to a lower side at the initial stage, but drastically increases thereafter.

The vehicle comprises preferably from 5 to 15 wt. % of the resin. In general, it is considered that incorporation of a large amount of a resin is favorable to improve abrasion resistance of a printed image. However, when a large amount of a resin is incorporated, the resulting ink composition tends to have a high viscosity. The above range is therefore suitable.

Preferred examples of the resin include polyester resins, polystyrene resins, polyester polyol resins, alkyd resins and acrylic resins.

Any coloring agent soluble in the vehicle can be used as the coloring agent, which is a component of the present invention. However, those coloring agents which have resistance to heat are preferred. Preferred examples of the coloring agent are as follows:

C.I Solvent Yellows 2, 14, 19, 33, 42, 48, 61, 79, 83, 93, 114 and 130;

C.I Solvent Reds 3, 8, 24, 49, 52, 84, 91, 92, 100, 109, 111, 127, 135 and 179;

C.I Solvent Blues 2, 11, 25, 35, 44, 45, 55 and 97; and

C.I Solvent Blacks 3, 5, 7, 22, 23 and 45;

The ink composition comprises 5 wt. % or less of the coloring agent. Even when the ink composition comprises approximately 2 wt. % of the coloring agent, color develops satisfactorily.

However, it was found that an ink composition comprising from 10 to 30 wt. % of the coloring agent is greatly effective for preventing a printed image from blooming. As described previously, blooming refers to a phenomenon in which a printed image looks as if it has a white bloom of fine crystals separated on the surface of the image. Such a phenomenon is considered to be caused as time goes by. In addition, it is presumed that blooming is accelerated when oil and fat contained in moisture or sweat is deposited as fingerprints on a printed image. Such blooming was unexpectedly prevented when an ink composition comprising from 10 to 30 wt. % of the coloring agent was used for printing. An ink composition comprising more than 30 wt. % of the coloring agent can also produce a printed image which is free from blooming. In this case, however, the ink composition tends to have an extremely high viscosity.

The blooming-preventing effect can be obtained independently of the presence of a dialkylbenzenesulfonamide in the ink composition.

The hot-melt ink composition of the present invention is used for printing at temperatures higher than room temperature. It is therefore preferable to add an antioxidant to the ink composition so that the ink composition can be prevented from thermal oxidization. Examples of the antioxidant usable in the present invention include hindered phenol compounds, arylamine compounds, phosphite compounds and thioester compounds.

Further, additives, such as various surface active agents which serve as surface tension modifiers and an ultraviolet absorbing agent which can prevent color fading caused by sunbeams, may be incorporated into the hot-melt ink composition of the present invention.

The ink composition of the present invention can be prepared by a known method. The vehicle, the coloring agent and some additives are mixed, and the resulting mixture is heated to temperatures higher than the melting points of the components of the vehicle. The mixture thus fused is thoroughly stirred to obtain a uniform fused composition, followed by filtration, if necessary, and cooling, thereby obtaining a desired hot-melt ink composition.

The hot-melt ink composition of the present invention has a shear strength of 0.2 kg/mm$^2$ or more, so that it can greatly improve the abrasion resistance of a printed image. In general, it is considered that a hot-melt ink composition having both a high shear strength and a high elongation is favorable from the viewpoint of abrasion resistance of a printed image. However, from the results of the experiment carried out by the inventors of the present invention, it was made clear that abrasion resistance of a printed image cannot be improved when the shear strength of the ink composition is less than 0.2 kg/mm$^2$ even if the elongation thereof is high. Shown in below Table 1 are preferred ranges of the shear strength and the elongation.

TABLE 1

| Shear Strength ($\tau$) (kg/mm$^2$) | Elongation ($\epsilon$) (%) |
|---|---|
| $0.4 \leq \tau$ | $25 \leq \epsilon$ |
| $0.3 \leq \tau \leq 0.4$ | $35 \leq \epsilon$ |
| $0.2 \leq \tau \leq 0.3$ | $50 \leq \epsilon$ |

The hot-melt ink composition according to the present invention can further comprise, besides the dialkylbenzenesulfonamide, monoalkylbenzenesulfonamide, resin and coloring agent, a benzenesulfonamide having the following formula (a):

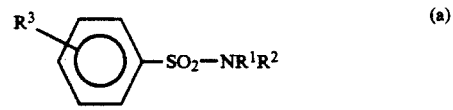

wherein R$^1$ and R$^2$ each independently represent a hydrogen atom, an alkyl group having 1 to 6 carbon atoms, a 5- or 6-membered cycloalkyl group, or a phenyl group, provided that R$^1$ and R$^2$ do not represent a hydrogen atom at the same time, and R$^3$ is an alkyl group having 1 to 4 carbon atoms.

The vehicle can comprise up to 5 wt. %, preferably from 1 to 3 wt. %, of the benzenesulfonamide having the formula (a). Flexibility is imparted to the ink composition when the benzenesulfonamide of formula (a) is incorporated therein. When a vehicle comprising more than 5 wt. % of the benzenesulfonamide of formula (a) is employed, the resulting ink composition is softened, and the mechanical strength and elongation thereof are decreased.

By the incorporation of the benzenesulfonamide having the formula (a), an ink composition having a shear strength of 0.2 kg/mm$^2$ or more and an elongation of 50% or more can be obtained. The relationship between the incorporation amount of the benzenesulfonamide of formula (a) and the shear strength and elongation is shown in Table 2.

TABLE 2

| Incorporation Amount of Compound (a) (wt. %) | Shear Strength ($\tau$) (kg/mm$^2$) | Elongation ($\epsilon$) (%) |
| --- | --- | --- |
| 0 | $\tau < 0.2$ | $\epsilon \leq 50$ |
| 1-3 | $0.3 \leq \tau$ | $60 \leq \epsilon$ |
| 4-5 | $0.2 \leq \tau < 0.3$ | $50 \leq \epsilon$ |
| 6 or more | $\tau < 0.2$ | $\epsilon \leq 25$ |

Examples of the benzenesulfonamide having the formula (a) preferably usable in the present invention include the following compounds:

N-ethyl-2-methylbenzenesulfonamide,
N-ethyl-4-methylbenzenesulfonamide,
N-cyclohexyl-4-methylbenzenesulfonamide (N-cyclohexyl-p-TSA),
N-n-butyl-4-methylbenzenesulfonamide (N-n-butyl-p-TSA),
N-phenyl-4-methylbenzenesulfonamide (N-phenyl-p-TSA),
N-methyl-4-methylbenzenesulfonamide (N-methyl-p-TSA),
N-isopropyl-4-methylbenzenesulfonamide (N-isopropyl-p-TSA),
N-n-butyl-ethylbenzenesulfonamide (N-n-butyl-p-EBSA),
N-t-butyl-2-methylbenzenesulfonamide (N-t-butyl-o-TSA),
N,N-diethyl-2-methylbenzenesulfonamide (N,N-diethyl-o-TSA), and
N,N-diethyl-4-methylbenzenesulfonamide (N,N-diethyl-p-TSA).

The hot-melt ink composition according to the present invention possesses other properties which are generally required to hot-melt ink compositions. For instance, it is preferable that the viscosity of a hot-melt ink composition at operating temperatures (100° to 150° C.) be 20.0 mPa.s or less. As long as the above requirement is fulfilled, the ink composition can be stably supplied, and desirable droplets thereof can be formed and stably ejected even when a head is responding at high speed. To attain higher speed response, the ink composition is required to have a viscosity of 5.0 to 15.0 mPa.s. The ink composition is also required to have, at the time of printing, a surface tension of 50 mN/m or less from the viewpoint of the formation of meniscus in the vicinity of a nozzle. A surface tension of 35 mN/m or less is more preferable when acceleration of permeation of the ink composition into recording paper after printing is taken into consideration. The hot-melt ink composition of the present invention satisfies the above-described requirements.

Other features of this invention will become apparent in the course of the following description of exemplary embodiments, which are given for illustrating of the invention and are not intended to be limiting thereof.

Preparation of Hot-Melt Ink Compositions

Hot-melt ink compositions A1 to A37 of the present invention, having the formulations shown in Table 4, were respectively prepared in accordance with a known method. Namely, the alkylbenzenesulfonamides, the resin and the coloring agent shown in the table were mixed while heating the mixture to temperatures higher than their melting points, preferably to temperatures 5°-15° C. higher than their melting points. After stirring thoroughly, the mixture was filtrated, followed by cooling, thereby obtaining the desired ink composition.

Comparative ink compositions A1 to A24, having the formulations shown in Table 5, were prepared in the same manner as in the above.

It is noted that the resins used in Examples A1 to A37 and Comparative Examples A1 to A24 are "Finedic M" (Trademark), polyester resins manufactured by Dainippon Ink & Chemical, Inc.; "Finedic A? (Trademark), polyester resins or acrylic resins manufactured by Dainippon Ink & Chemical, Inc.; "Polyester Resin X" manufactured by Toray Industries, Inc.; "Desmophene" (Trademark), polyester resins manufactured by Sumitomo Bayer Urethane Co., Ltd.; "Nippollan 2200" (Trademark), a polyester polyol resin manufactured by Nippon Polyurethane Industry Co., Ltd.; and "RJ-100" (Trademark), a styrene-allylalcohol copolymer manufacture by Monsanto Chemical Corp. Hydroxyl numbers, acid numbers, and molecular weights of the above resins are shown in below Table 3.

TABLE 3

| Resin | Hydroxyl Number (KOH mg/g) | Acid Number (KOH mg/g) | Weight-Average Molecular Weight | Number-Average Molecular Weight |
| --- | --- | --- | --- | --- |
| Finedic M-8075 | 43 | — | 14,000 | 4,000 |
| Finedic M-8020 | 30 | — | 17,000 | 4,000 |
| Finedic A-239X | 22 | 14 | 10,000 | 4,000 |
| Finedic A-239Y | 15 | 23 | 12,000 | 4,500 |
| Finedic A-239W | 10 | 14 | 18,000 | 5,500 |
| Finedic M-8630 | — | 26 | 18,000 | 5,000 |
| Finedic M-8500 | — | 54 | 18,000 | 3,700 |
| Polyester Resin X | 390 | 26 | — | — |
| Desmophene 650 | 212 | ≦4 | 3,500 | 1,140 |
| Desmophene 651 | 212 | ≦4 | 8,470 | 1,530 |
| Nippollan 2200 | 62 | 1 | — | — |
| RJ-100 | 187 | — | 2,340 | 1,600 |
| Finedic A-239W | 53 | — | 10,000 | 3,500 |

Evaluation Tests (1) Measurement of Shear Strength

The ink compositions of the invention and the comparative ones were respectively formed into a cylindrical pellet with a diameter of 4 mm and a length of 4 mm, as shown in FIG. 1 (a). The shear strengths of the pellets thus obtained were measured by a compression tester as shown in FIG. 1 (b).

At first, the pellet 1 was fixed on a support 22, and shearing stress was applied thereto by a crosshead 21 in the direction of F with a rate of 10 mm/min. The stress applied was detected by a load cell 23. The detected stress was recorded on a chart, and the peak value of the stress, at which the pellet was broken, was determined as the shear strength.

The results are shown in Tables 4 and 5.

(2) Measurement of Elongation

Upon conducting the above measurement of the shear strengths, the elongations were also determined in the following manner:

When the pellet was broken with the application of shearing stress thereto, the penetrated area of the cross-head 21 into the pellet was measured. The elongation was obtained by calculating the proportion (%) of the above area to the cross-sectional area of the pellet.

(3) Measurement of Viscosity

The viscosities at 120° C. of some of the ink compositions of the present invention and the comparative ones were respectively measured, and evaluated in accordance with the following standard:

20 mPa.s or less (suitable for printing): ⊚ more than 20 mPa.s (unsuitable for printing, an image cannot be printed): x

The results are shown in Tables 4 and 5.

(4) Evaluation of Abrasion Resistance of Printed Image

The ink compositions of the present invention and the comparative ones were subjected to image printing. Images were printed on various recording sheets using an on-demand type (impulse type) ink jet printer. The printed images were rubbed with a clip with a load of 200 kg/mm². The rubbed images were evaluated in accordance with the following standard:

Not stained even when the image was rubbed reciprocatingly 40 times or more: ⊚

Stained when the image was rubbed reciprocatingly from 30 to 40 times: ○

Stained when the image was rubbed reciprocatingly less than 30 times: ×

The results are shown in Tables 4 and 5.

(5) Evaluation of Blooming

Images were printed in the same manner as in the above (4), and the sheets bearing the printed images were then allowed to stand at room temperature. The images were visually observed after the predetermined periods of time, and evaluated in accordance with the following standard:

Even after 3 months or more, no blooming was observed: ⊚

Within 3 months, blooming was observed: ×

(6) Evaluation of Heat Resistance (1)

The ink compositions of the invention and the comparative ones were preserved at a temperature of 150° C. Changes in mechanical strength, hue and physical properties (viscosity, surface tension and melting point) with time were measured. The life, a duration for which the ink composition can maintain the initially possessed properties, was evaluated in accordance with the following standard:

The life was 100 hours or more: ⊚

The life was 10 hours or more, and less than 100 hours: ○

The life was less than 10 hours: ×

The results are shown in Tables 4 and 5.

(7) Evaluation of Heat Resistance (2)

Some of the ink compositions of the present invention and the comparative ones were preserved at a temperature of 150°. C. The duration of time was measured, for which the ink composition underwent no change in properties and gave no adverse effects upon conducting image printing, and was evaluated as follows:

500 hours or more: ⊚

250 hours or more, and less than 500 hours: ○ less than 250 hours: ×

The results are shown in Tables 4 and 5.

TABLE 4

| Example No. | A1 | A2 | A3 | A4 | A5 | A6 | A7 | A8 |
|---|---|---|---|---|---|---|---|---|
| 3,4-dimethyl-BSA (XSA) | 30 | 30 | 30 | 40 | 40 | 40 | — | 40 |
| 2,4-dimethyl-BSA | — | — | — | — | — | — | — | — |
| 2,4-diethyl-BSA | — | — | — | — | — | — | — | — |
| 2,5-dimethyl-BSA | — | — | — | — | — | — | — | — |
| 2,4-dibutyl-BSA | — | — | — | — | — | — | — | — |
| 3,4-dipentyl-BSA | — | — | — | — | — | — | 40 | — |
| 3,4-dihexyl-BSA | — | — | — | — | — | — | — | — |
| p-TSA | 60 | 60 | 59 | 50 | 50 | 50 | 48 | 48 |
| o-TSA | — | — | — | — | — | — | — | — |
| p-EBSA | — | — | — | — | — | — | — | — |
| p-n-Butyl-BSA | 1 | 1 | 1 | 2 | 2 | 2 | 2 | 2 |
| Finedic | | | | | | | | |
| M-8076 | — | 10 | 10 | — | — | — | — | — |
| M-8020 | — | — | — | — | — | — | — | — |
| A-239X | — | — | — | — | — | — | — | — |
| A-239Y | — | — | — | — | — | — | — | — |
| A-239W | — | — | — | — | — | — | — | 10 |
| M-8630 | — | — | — | — | 10 | — | — | — |
| M-8500 | — | — | — | — | — | — | — | — |
| Polyester Resin X | — | — | — | — | — | — | — | — |
| Desmophene | | | | | | | | |
| 650 | 10 | — | — | — | — | — | — | — |
| 651 | — | — | — | — | — | — | — | — |
| Nippollan 2200 | — | — | — | 10 | — | 10 | 10 | — |
| RJ-100 | — | — | — | — | — | — | — | — |
| Finedic A-244 | — | — | — | — | — | — | — | — |
| N-cyclohexyl-p-TSA | — | — | — | — | — | — | — | — |
| N-phenyl-p-TSA | — | — | — | — | — | — | — | — |
| N-t-butyl-o-TSA | — | — | — | — | — | — | — | — |
| N,N-diethyl-o/p-TSA | — | — | — | — | — | — | — | — |
| solvent black 45 | 2 | 2 | 2 | — | — | 2 | 2 | 2 |
| solvent red 127 | — | — | — | 2 | 2 | — | — | — |
| solvent yellow 79 | — | — | — | — | — | — | — | — |
| solvent blue 44 | — | — | — | — | — | — | — | — |
| Shear Strength (kg/mm²) | .32 | .32 | .36 | .47 | .51 | .47 | .35 | .51 |
| Elongation (%) | 35 | 40 | 40 | 40 | 45 | 40 | 35 | 45 |
| Viscosity (mpa · s) | | | ⊚ | | | | | ⊚ |
| Abrasion Resistance | ⊚ | ⊚ | ⊚ | ⊚ | ⊚ | ⊚ | ⊚ | ⊚ |
| Blooming | ⊚ | ⊚ | ⊚ | ⊚ | ⊚ | ⊚ | ⊚ | ⊚ |
| Heat Resistance (1) | ⊚ | ⊚ | ⊚ | ⊚ | ⊚ | ⊚ | ⊚ | ⊚ |
| Heat | | | ⊚ | | | | ⊚ | ⊚ |

TABLE 4-continued

| Resistance (2) | | | | | | | | |
|---|---|---|---|---|---|---|---|---|
| Example No. | A9 | A10 | A11 | A12 | A13 | A14 | A15 | A16 |
| 3,4-dimethyl-BSA (XSA) | 40 | 30 | 30 | 20 | 30 | 30 | — | 30 |
| 2,4-dimethyl-BSA | — | — | — | 10 | — | — | — | — |
| 2,4-diethyl-BSA | — | — | — | — | — | — | 30 | — |
| 2,5-dimethyl-BSA | — | — | — | — | — | — | — | — |
| 2,4-dibutyl-BSA | — | — | — | — | — | — | — | — |
| 3,4-dipentyl-BSA | — | — | — | — | — | 40 | — | — |
| 3,4-dihexyl-BSA | — | — | — | — | — | — | — | — |
| p-TSA | 48 | 40 | 40 | 40 | 20 | 20 | 20 | 18 |
| o-TSA | — | — | — | — | — | — | — | — |
| p-EBSA | — | 20 | 20 | 20 | 40 | 40 | 40 | 36 |
| p-n-Butyl-BSA | — | 1 | 1 | 1 | 1 | 1 | 1 | 1 |
| Finedic | | | | | | | | |
| M-8076 | — | — | — | — | — | — | — | — |
| M-8020 | 10 | — | — | — | — | — | — | — |
| A-239X | — | — | — | — | — | 10 | — | 15 |
| A-239Y | — | — | — | — | — | — | — | — |
| A-239W | — | — | 10 | — | — | — | — | — |
| M-8630 | — | — | — | — | — | — | — | — |
| M-8500 | — | — | — | — | — | — | — | — |
| Polyester Resin X | — | — | — | — | — | — | — | — |
| Desmophene | | | | | | | | |
| 650 | — | — | — | — | 10 | — | 10 | — |
| 651 | — | — | — | — | — | — | — | — |
| Nippollan 2200 | — | — | — | — | — | — | — | — |
| RJ-100 | — | 10 | — | 10 | — | — | — | — |
| Finedic A-244 | — | — | — | — | — | — | — | — |
| N-cyclohexyl-p-TSA | — | — | — | — | — | — | — | — |
| N-phenyl-p-TSA | — | — | — | — | — | — | — | — |
| N-t-butyl-o-TSA | 1 | — | — | — | — | — | — | — |
| N,N-diethyl-o/p-TSA | — | — | — | — | — | — | — | — |
| solvent black 45 | — | — | 2 | — | — | — | — | — |
| solvent red 127 | — | — | — | — | — | — | — | — |
| solvent yellow 79 | 2 | 2 | — | 2 | — | 2 | 2 | 2 |
| solvent blue 44 | — | — | — | — | 2 | — | — | — |
| Shear Strength (kg/mm²) | .48 | .36 | .39 | .35 | .38 | .42 | .36 | .40 |
| Elongation (%) | 60 | 50 | 55 | 50 | 70 | 75 | 50 | 70 |
| Viscosity (mpa · s) | | | | | | | | ⊚ |
| Abrasion Resistance | ⊚ | ⊚ | ⊚ | ⊚ | ⊚ | ⊚ | ⊚ | ⊚ |
| Blooming | ⊚ | ⊚ | ⊚ | ⊚ | ⊚ | ⊚ | ⊚ | ⊚ |
| Heat Resistance (1) | ⊚ | ⊚ | ⊚ | ⊚ | ⊚ | ⊚ | ⊚ | ⊚ |
| Heat Resistance (2) | | | | | | | | ⊚ |

| Example No. | A17 | A18 | A19 | A20 | A21 | A22 | A23 | A24 |
|---|---|---|---|---|---|---|---|---|
| 3,4-dimethyl-BSA (XSA) | 30 | 10 | 10 | 10 | 10 | 10 | 10 | 20 |
| 2,4-dimethyl-BSA | — | — | — | — | — | — | — | — |
| 2,4-diethyl-BSA | — | — | — | — | — | — | — | — |
| 2,5-dimethyl-BSA | — | — | — | — | — | — | — | — |
| 2,4-dibutyl-BSA | — | — | — | — | — | — | — | — |
| 3,4-dipentyl-BSA | — | — | — | — | — | — | — | — |
| 3,4-dihexyl-BSA | — | — | — | — | — | — | — | — |
| p-TSA | 18 | 60 | 60 | 58 | 57 | 57 | 57 | 40 |
| o-TSA | — | — | — | — | — | — | — | — |
| p-EBSA | 36 | 20 | 20 | 20 | 18 | 18 | 18 | 30 |
| p-n-Butyl-BSA | — | 2 | 2 | 2 | — | — | — | 1 |
| Finedic | | | | | | | | |
| M-8076 | — | — | — | — | — | — | — | — |
| M-8020 | — | — | 10 | 10 | — | — | 10 | — |
| A-239X | 15 | — | — | — | 10 | 10 | — | — |
| A-239Y | — | — | — | — | — | — | — | — |
| A-239W | — | — | — | — | — | — | — | — |
| M-8630 | — | — | — | — | — | — | — | — |
| M-8500 | — | — | — | — | — | — | — | — |
| Polyester Resin X | — | — | — | — | — | — | — | — |
| Desmophene | | | | | | | | |
| 650 | — | 10 | — | — | — | — | — | 10 |
| 651 | — | — | — | — | — | — | — | — |
| Nippollan 2200 | — | — | — | — | — | — | — | — |
| RJ-100 | — | — | — | — | — | — | — | — |
| Finedic A-244 | — | — | — | — | — | — | — | — |
| N-cyclohexyl-p-TSA | 1 | — | — | — | — | — | — | — |
| N-phenyl-p-TSA | — | — | — | — | 5 | — | — | — |
| N-t-butyl-o-TSA | — | — | — | — | — | 2 | — | — |
| N,N-diethyl-o/p-TSA | — | — | — | — | — | — | 1 | — |
| solvent black 45 | — | 2 | — | — | — | — | — | — |
| solvent red 127 | 2 | — | 2 | 2 | 2 | — | — | 2 |
| solvent yellow 79 | — | — | — | — | — | 2 | — | — |
| solvent blue 44 | — | — | — | — | — | — | 2 | — |
| Shear Strength (kg/mm²) | .40 | .30 | .34 | .34 | .35 | .35 | .33 | .27 |
| Elongation (%) | 75 | 45 | 50 | 50 | 55 | 85 | 90 | 65 |
| Viscosity (mpa · s) | | | | ⊚ | | | | |
| Abrasion Resistance | ⊚ | ⊚ | ⊚ | ⊚ | ⊚ | ⊚ | ⊚ | ⊚ |
| Blooming | ⊚ | ⊚ | ⊚ | ⊚ | ⊚ | ⊚ | ⊚ | ⊚ |
| Heat Resistance (1) | ⊚ | ⊚ | ⊚ | ⊚ | ⊚ | ⊚ | ⊚ | ⊚ |
| Heat Resistance (2) | | | | ⊚ | | | | |

| Example No. | A25 | A26 | A27 | A28 | A29 | A30 | A31 | A32 |
|---|---|---|---|---|---|---|---|---|
| 3,4-dimethyl-BSA (XSA) | 20 | — | 20 | 20 | 10 | 10 | — | 10 |
| 2,4-dimethyl-BSA | — | — | — | — | — | — | 10 | — |
| 2,4-diethyl-BSA | — | — | — | — | — | — | — | — |
| 2,5-dimethyl-BSA | — | — | — | — | — | — | — | — |
| 2,4-dibutyl-BSA | — | — | — | — | — | — | — | — |
| 3,4-dipentyl-BSA | — | — | — | — | — | — | — | — |
| 3,4-dihexyl-BSA | — | — | — | — | — | — | — | — |
| p-TSA | 40 | 40 | 42 | 39 | 40 | 40 | 40 | 42 |
| o-TSA | — | — | — | — | — | — | — | — |
| p-EBSA | 30 | 30 | 32 | 30 | 40 | 40 | 40 | 42 |
| p-n-Butyl-BSA | 1 | 1 | 1 | — | 2 | 2 | 2 | 1 |
| Finedic | | | | | | | | |
| M-8076 | — | — | — | — | — | — | — | — |
| M-8020 | — | — | 10 | — | — | — | — | — |
| A-239X | — | — | — | — | — | — | — | — |
| A-239Y | 10 | — | 5 | — | — | — | — | — |

TABLE 4-continued

| | | | | | | | | |
|---|---|---|---|---|---|---|---|---|
| A-239W | — | — | — | — | — | — | — | — |
| M-8630 | — | — | — | — | — | — | — | 5 |
| M-8500 | — | — | — | — | — | 10 | — | — |
| Polyester Resin X | — | — | — | — | — | — | — | — |
| Desmophene | | | | | | | | |
| 650 | — | 10 | — | — | 10 | — | 10 | — |
| 651 | — | — | — | — | — | — | — | — |
| Nippollan 2200 | — | — | — | — | — | — | — | — |
| RJ-100 | — | — | — | — | — | — | — | — |
| Finedic A-244 | — | — | — | — | — | — | — | — |
| N-cyclohexyl-p-TSA | — | — | — | 1 | — | — | — | — |
| N-phenyl-p-TSA | — | — | — | — | — | — | — | — |
| N-t-butyl-o-TSA | — | — | — | — | — | — | — | — |
| N,N-diethyl-o/p-TSA | — | — | — | — | — | — | — | — |
| solvent black 45 | — | 2 | — | 2 | — | — | — | — |
| solvent red 127 | — | — | — | — | — | — | 2 | 2 |
| solvent yellow 79 | — | — | — | — | 2 | 2 | — | — |
| solvent blue 44 | 2 | — | 2 | — | — | — | — | — |
| Shear Strength (kg/mm²) | .30 | .25 | .28 | .32 | .22 | .25 | .22 | .25 |
| Elongation (%) | 70 | 60 | 65 | 80 | 50 | 55 | 50 | 55 |
| Viscosity (mpa·s) | | ⊚ | | | | | | ⊚ |
| Abrasion Resistance | ⊚ | ⊚ | ⊚ | ⊚ | ⊚ | ⊚ | ⊚ | ⊚ |
| Blooming | ⊚ | ⊚ | ⊚ | ⊚ | ⊚ | ⊚ | ⊚ | ⊚ |
| Heat Resistance (1) | ⊚ | ⊚ | ⊚ | ⊚ | ⊚ | ⊚ | ⊚ | ⊚ |
| Heat Resistance (2) | | ⊚ | | | | | | ⊚ |

| Example No. | A33 | A34 | A35 | A36 | A37 |
|---|---|---|---|---|---|
| 3,4-dimethyl-BSA (XSA) | 10 | 10 | 10 | 10 | 10 |
| 2,4-dimethyl-BSA | — | — | — | — | — |
| 2,4-diethyl-BSA | — | — | — | — | — |
| 2,5-dimethyl-BSA | — | — | — | — | — |
| 2,4-dibutyl-BSA | — | — | — | — | — |
| 3,4-dipentyl-BSA | — | — | — | — | — |
| 3,4-dihexyl-BSA | — | — | — | — | — |
| p-TSA | 42 | 20 | 20 | 20 | 48 |
| o-TSA | — | — | — | — | — |
| p-EBSA | 42 | 60 | 60 | 59 | 29 |
| p-n-Butyl-BSA | — | 1 | 1 | 1 | — |
| Finedic | | | | | |
| M-8076 | — | — | — | — | — |
| M-8020 | 5 | — | — | — | — |
| A-239X | — | — | — | — | — |
| A-239Y | — | — | — | — | 10 |
| A-239W | — | — | — | — | — |
| M-8630 | — | — | — | — | — |
| M-8500 | — | — | — | 10 | — |
| Polyester Resin X | — | — | 10 | — | — |
| Desmophene | | | | | |
| 650 | — | — | — | — | — |
| 651 | — | — | — | — | — |
| Nippollan 2200 | — | — | — | — | — |
| RJ-100 | — | — | — | — | — |
| Finedic A-244 | — | 10 | — | — | — |
| N-cyclohexyl-p-TSA | — | — | — | — | — |
| N-phenyl-p-TSA | 2 | — | — | — | 3 |
| N-t-butyl-o-TSA | — | — | — | — | — |
| N,N-diethyl-o/p-TSA | — | — | — | — | 2 |
| solvent black 45 | — | — | — | — | — |
| solvent red 127 | — | — | — | — | — |
| solvent yellow 79 | — | — | — | 2 | — |
| solvent blue 44 | 2 | 2 | 2 | — | — |
| Shear Strength (kg/mm²) | .32 | .23 | .26 | .26 | .30 |
| Elongation (%) | 75 | 65 | 70 | 70 | 80 |
| Viscosity (mpa·s) | | | | ⊚ | |
| Abrasion Resistance | ⊚ | ⊚ | ⊚ | ⊚ | ⊚ |
| Blooming | ⊚ | ⊚ | ⊚ | ⊚ | ⊚ |
| Heat Resistance (1) | ⊚ | ⊚ | ⊚ | ⊚ | ⊚ |
| Heat Resistance (2) | | | | ⊚ | |

TABLE 5

| Comparative Example No. | A1 | A2 | A3 | A4 | A5 | A6 | A7 | A8 |
|---|---|---|---|---|---|---|---|---|
| 3,4-dimethyl-BSA (XSA) | — | — | — | — | — | — | — | — |
| 2,4-dimethyl-BSA | — | — | — | — | — | — | — | — |
| 2,4-diethyl-BSA | — | — | — | — | — | — | — | — |
| 2,5-dimethyl-BSA | — | — | — | — | — | — | — | — |
| 2,4-dibutyl-BSA | — | — | — | — | — | — | — | — |
| 3,4-dipentyl-BSA | — | — | — | — | — | — | — | — |
| 3,4-dihexyl-BSA | — | — | — | — | — | — | — | — |
| p-TSA | 50 | 50 | 50 | 49 | 49 | 60 | 60 | 58 |
| o-TSA | 40 | 40 | 40 | 39 | 39 | 30 | 30 | 30 |
| p-EBSA | — | — | — | — | — | — | — | — |
| p-n-Butyl-BSA | 2 | 2 | 2 | 2 | 2 | 2 | 2 | 2 |
| Finedic | | | | | | | | |
| M-8076 | — | — | — | — | — | — | — | — |
| M-8020 | — | — | — | — | — | — | — | — |
| A-239X | — | — | — | — | — | — | — | — |
| A-239Y | — | — | — | — | — | — | — | — |
| A-239W | — | — | — | — | — | — | — | — |
| M-8630 | — | — | — | — | — | — | — | — |
| M-8500 | — | — | — | — | — | — | — | — |
| Polyester Resin X | — | — | — | — | — | — | — | — |
| Desmophene | | | | | | | | |
| 650 | — | — | — | — | 10 | — | — | — |
| 651 | — | — | — | 10 | — | — | — | — |
| Nippollan 2200 | 10 | 10 | 10 | — | — | — | — | — |
| RJ-100 | — | — | — | — | — | 10 | 10 | 10 |
| Finedic A-244 | — | — | — | — | — | — | — | — |
| N-cyclohexyl-p-TSA | — | — | — | — | — | — | — | — |
| N-phenyl-p-TSA | — | — | — | — | — | — | — | — |
| N-t-butyl-o-TSA | — | — | — | — | — | — | — | — |
| N,N-diethyl-o/p-TSA | — | — | — | — | — | — | — | — |
| solvent black 45 | — | — | 2 | 2 | — | — | — | — |

TABLE 5-continued

| | | | | | | | | |
|---|---|---|---|---|---|---|---|---|
| solvent red 127 | — | 2 | — | — | 2 | — | — | 2 |
| solvent yellow 79 | — | — | — | — | — | 2 | 2 | — |
| solvent blue 44 | 2 | — | — | — | — | — | — | — |
| Shear Strength (kg/mm²) | .10 | .10 | .10 | .12 | .12 | .12 | .12 | .12 |
| Elongation (%) | 10 | 10 | 10 | 20 | 20 | 15 | 15 | 15 |
| Viscosity (mpa·s) | | | ⊙ | | | | | ⊙ |
| Abrasion Resistance | X | X | X | X | X | X | X | X |
| Blooming | X | X | X | X | X | X | X | X |
| Heat Resistance (1) | ○ | ○ | ○ | ○ | ○ | ○ | ○ | ○ |
| Heat Resistance (2) | | | | X | | | | X |

| Comparative Example No. | A9 | A10 | A11 | A12 | A13 | A14 | A15 | A16 |
|---|---|---|---|---|---|---|---|---|
| 3,4-dimethyl-BSA (XSA) | — | — | — | — | — | — | — | — |
| 2,4-dimethyl-BSA | — | — | — | — | — | — | — | — |
| 2,4-diethyl-BSA | — | — | — | — | — | — | — | — |
| 2,5-dimethyl-BSA | — | — | — | — | — | — | — | — |
| 2,4-dibutyl-BSA | — | — | — | — | — | — | — | — |
| 3,4-dipentyl-BSA | — | — | — | — | — | — | — | — |
| 3,4-dihexyl-BSA | — | — | — | — | — | — | — | — |
| p-TSA | 20 | 40 | 40 | 39 | 50 | 50 | 50 | 49 |
| o-TSA | — | — | — | — | — | — | — | — |
| p-EBSA | 70 | 50 | 50 | 49 | 40 | 40 | 40 | 39 |
| p-n-Butyl-BSA | 2 | 2 | 2 | 2 | 2 | 2 | 2 | 2 |
| Finedic | | | | | | | | |
| M-8076 | — | — | — | — | — | — | — | — |
| M-8020 | — | — | — | — | — | — | — | — |
| A-239X | — | — | — | — | — | — | 10 | — |
| A-239Y | — | — | — | — | — | — | — | — |
| A-239W | — | — | — | — | — | — | — | — |
| M-8630 | — | — | — | — | — | — | — | — |
| M-8500 | — | — | — | — | — | — | — | — |
| Polyester Resin X | — | — | — | — | — | — | — | — |
| Desmophene | | | | | | | | |
| 650 | 10 | — | — | — | 10 | 10 | — | 10 |
| 651 | — | — | — | — | — | — | — | — |
| Nippollan 2200 | — | — | — | — | — | — | — | — |
| RJ-100 | — | — | — | — | — | — | — | — |
| Finedic A-244 | — | 10 | 10 | 10 | — | — | — | — |
| N-cyclohexyl-p-TSA | — | — | — | — | — | — | — | — |
| N-phenyl-p-TSA | — | — | — | — | — | — | — | — |
| N-t-butyl-o-TSA | — | — | — | — | — | — | — | — |
| N,N-diethyl-o/p-TSA | — | — | — | — | — | — | — | — |
| solvent black 45 | 2 | — | — | — | — | 2 | 2 | — |
| solvent red 127 | — | 2 | — | — | — | — | — | — |
| solvent yellow 79 | — | — | — | 2 | 2 | — | — | — |
| solvent blue 44 | — | — | 2 | — | — | — | — | 2 |
| Shear Strength (kg/mm²) | .06 | .14 | .14 | .14 | .16 | .16 | .14 | .16 |
| Elongation (%) | 35 | 25 | 25 | 25 | 35 | 35 | 30 | 35 |
| Viscosity (mpa·s) | | | | ⊙ | | | | ⊙ |
| Abrasion Resistance | X | ○ | ○ | ○ | ○ | ○ | ○ | ○ |
| Blooming | ⊙ | ⊙ | ⊙ | ⊙ | ⊙ | ⊙ | ⊙ | ⊙ |
| Heat Resistance (1) | X | ○ | ○ | ○ | ○ | ○ | ○ | ○ |
| Heat Resistance (2) | | | | ○ | | | | X |

| Comparative Example No. | A17 | A18 | A19 | A20 | A21 | A22 | A23 | A24 |
|---|---|---|---|---|---|---|---|---|
| 3,4-dimethyl-BSA (XSA) | — | — | — | — | — | — | — | 10 |
| 2,4-dimethyl-BSA | — | — | — | — | — | — | — | — |
| 2,4-diethyl-BSA | — | — | — | — | — | — | — | — |
| 2,5-dimethyl-BSA | — | — | — | — | — | — | — | — |
| 2,4-dibutyl-BSA | — | — | — | — | — | — | — | — |
| 3,4-dipentyl-BSA | — | — | — | — | — | — | — | — |
| 3,4-dihexyl-BSA | — | — | — | — | — | — | — | — |
| p-TSA | 49 | 49 | 49 | 70 | 70 | 44 | 44 | 57 |
| o-TSA | — | — | — | — | — | — | — | — |
| p-EBSA | 39 | 39 | 39 | 20 | 20 | 35 | 35 | 18 |
| p-n-Butyl-BSA | 2 | 2 | 2 | 2 | 2 | 1 | 1 | — |
| Finedic | | | | | | | | |
| M-8076 | — | — | — | — | — | — | — | — |
| M-8020 | — | — | — | — | — | — | — | 10 |
| A-239X | 10 | — | 10 | — | — | 20 | 20 | — |
| A-239Y | — | — | — | — | — | — | — | — |
| A-239W | — | — | — | — | — | — | — | — |
| M-8630 | — | — | — | — | — | — | — | — |
| M-8500 | — | — | — | — | — | — | — | — |
| Polyester Resin X | — | — | — | — | 10 | — | — | — |
| Desmophene | | | | | | | | |
| 650 | — | 10 | — | 10 | — | — | — | — |
| 651 | — | — | — | — | — | — | — | — |
| Nippollan 2200 | — | — | — | — | — | — | — | — |
| RJ-100 | — | — | — | — | — | — | — | — |
| Finedic A-244 | — | — | — | — | — | — | — | — |
| N-cyclohexyl-p-TSA | — | — | — | — | — | — | — | — |
| N-phenyl-p-TSA | — | — | — | — | — | — | — | — |
| N-t-butyl-o-TSA | — | — | — | — | — | — | — | — |
| N,N-diethyl-o/p-TSA | — | — | — | — | — | — | — | 6 |
| solvent black 45 | — | 2 | — | 2 | 2 | — | — | 2 |
| solvent red 127 | — | — | — | — | — | — | — | — |
| solvent yellow 79 | — | — | 2 | — | — | — | — | — |
| solvent blue 44 | 2 | — | — | 2 | — | — | 2 | — |
| Shear Strength (kg/mm²) | .14 | .16 | .14 | .10 | .08 | .20 | .18 | .12 |
| Elongation (%) | 30 | 35 | 30 | 5 | 5 | 50 | 50 | 15 |
| Viscosity (mpa·s) | ⊙ | | | | | X | | |
| Abrasion Resistance | ○ | ○ | ○ | X | X | — | — | X |
| Blooming | ⊙ | ⊙ | ⊙ | ⊙ | ⊙ | — | — | X |
| Heat Resistance (1) | ○ | ○ | ○ | X | X | ○ | ○ | ○ |
| Heat Resistance (2) | X | | | | | X | | |

Evaluation of Blooming-Preventing Effect

Hot-melt ink compositions having the formulations shown in Tables 6 and 7 were respectively prepared in the same manner as in Examples A1 to A34. By using the ink compositions obtained, images were printed in the same manner as in the evaluation test of abrasion resistance (above item (4)). The sheets bearing the printed images were respectively preserved under the following three conditions:

(i) at room temperature (RT),
(ii) at a temperature of 40° C. and a relative humidity of 90%, and
(iii) after depositing fingerprints, at room temperature.

The evaluation was carried out in terms of blooming caused on the surface of the images printed. The results are shown in Tables 6 and 7.

(i) When preserved at room temperature,
observed no blooming for 6 months or more: ⊚⊚ observed no blooming for 3 months or more: ⊚
(ii) When preserved at 40° C. and 90% RH,
observed no blooming for 1 month or more: ⊚
observed blooming within 1 month: X
(iii) When preserved at room temperature after depositing fingerprints,
observed no blooming for 3 months or more: ⊚
observed blooming within 3 months: X

TABLE 6

| Example No. | B1 | B2 | B3 | B4 | B5 | B6 | B7 | B8 |
|---|---|---|---|---|---|---|---|---|
| 3,4-dimethyl-BSA (XSA) | 25 | 23 | 31 | 35 | 24 | — | 25 | — |
| 2,4-dimethyl-BSA | — | — | — | — | — | — | — | — |
| 2,4-diethyl-BSA | — | — | — | — | — | 24 | — | — |
| 2,5-dimethyl-BSA | — | — | — | — | — | — | — | — |
| 2,4-dibutyl-BSA | — | — | — | — | — | — | — | 20 |
| 3,4-dipentyl-BSA | — | — | — | — | — | — | — | — |
| 3,4-dihexyl-BSA | — | — | — | — | — | — | — | — |
| p-TSA | 54 | 51 | 40 | 44 | 35 | 20 | 18 | 35 |
| o-TSA | — | — | — | — | — | — | — | — |
| p-EBSA | — | — | — | — | 20 | 35 | 30 | 24 |
| p-n-Butyl-BSA | 1 | 1 | 1 | — | 1 | 1 | — | 1 |
| Finedic M-8076 | — | 10 | — | — | — | — | — | — |
| M-8020 | — | — | — | 10 | — | — | — | — |
| A-239X | — | — | — | — | — | — | 15 | — |
| A-239Y | — | — | — | — | — | — | — | 10 |
| A-239W | — | — | 8 | — | 10 | — | — | — |
| M-8630 | — | — | — | — | — | — | — | — |
| M-8500 | — | — | — | — | — | — | — | — |
| Polyester Resin X | — | — | — | — | — | — | — | — |
| Desmophene 650 | 10 | — | — | — | — | 10 | — | — |
| 651 | — | — | — | — | — | — | — | — |
| Nippollan 2200 | — | — | — | — | — | — | — | — |
| RJ-100 | — | — | — | — | — | — | — | — |
| Finedic A-244 | — | — | — | — | — | — | — | — |
| N-cyclohexyl-p-TSA | — | — | — | — | — | — | 1 | — |
| N-phenyl-p-TSA | — | — | — | — | — | — | — | — |
| N-t-butyl-o-TSA | — | — | — | 1 | — | — | — | — |
| N,N-diethyl-o/p-TSA | — | — | — | — | — | — | — | 6 |
| solvent black 45 | 10 | 15 | 20 | — | — | — | — | — |
| solvent red 127 | — | — | — | — | 3.8 | — | 10 | — |
| solvent yellow 79 | — | — | — | 10 | 2.8 | 10 | — | — |
| solvent blue 44 | — | — | — | — | 3.4 | — | — | 10 |
| Blooming at RT | ⊚⊚ | ⊚⊚ | ⊚⊚ | ⊚⊚ | ⊚⊚ | ⊚⊚ | ⊚⊚ | ⊚⊚ |
| at 40° C. 90 RH | ⊚ | ⊚ | ⊚ | ⊚ | ⊚ | ⊚ | ⊚ | ⊚ |
| Fingerprint | ⊚ | ⊚ | ⊚ | ⊚ | ⊚ | ⊚ | ⊚ | ⊚ |

| Example No. | B9 | B10 | B11 | B12 |
|---|---|---|---|---|
| 3,4-dimethyl-BSA (XSA) | 10 | — | — | 10 |
| 2,4-dimethyl-BSA | — | — | — | — |
| 2,4-diethyl-BSA | — | — | — | — |
| 2,5-dimethyl-BSA | — | — | — | — |
| 2,4-dibutyl-BSA | — | — | — | — |
| 3,4-dipentyl-BSA | — | — | — | — |
| 3,4-dihexyl-BSA | — | — | — | — |
| p-TSA | 32 | 45 | 56 | 32 |
| o-TSA | — | 23 | 12 | — |
| p-EBSA | 32 | — | — | 14 |
| p-n-Butyl-BSA | 1 | 2 | 2 | — |
| Finedic M-8076 | — | — | — | — |
| M-8020 | — | — | — | 8 |
| A-239X | — | — | — | — |
| A-239Y | — | — | — | — |
| A-239W | — | — | — | — |
| M-8630 | 5 | — | — | — |
| M-8500 | — | — | — | — |
| Polyester Resin X | — | — | — | — |
| Desmophene 650 | — | — | — | — |
| 651 | — | — | — | — |
| Nippollan 2200 | — | 10 | — | — |
| RJ-100 | — | — | 10 | — |
| Finedic A-244 | — | — | — | — |
| N-cyclohexyl-p-TSA | — | — | — | — |
| N-phenyl-p-TSA | — | — | — | — |
| N-t-butyl-o-TSA | — | — | — | — |
| N,N-diethyl-o/p-TSA | — | — | — | 6 |
| solvent black 45 | — | — | — | 30 |
| solvent red 127 | 20 | — | — | — |
| solvent yellow 79 | — | — | 20 | — |
| solvent blue 44 | — | 20 | — | — |
| Blooming at RT | ⊚⊚ | ⊚⊚ | ⊚⊚ | ⊚⊚ |
| at 40° C. 90 RH | ⊚ | ⊚ | ⊚ | ⊚ |
| Fingerprint | ⊚ | ⊚ | ⊚ | ⊚ |

TABLE 7

| Comparative Example No. | B1 | B2 | B3 | B4 | B5 |
|---|---|---|---|---|---|
| 3,4-dimethyl-BSA (XSA) | 29 | 40 | — | — | 10 |
| 2,4-dimethyl-BSA | — | — | — | — | — |
| 2,4-diethyl-BSA | — | — | — | — | — |
| 2,5-dimethyl-BSA | — | — | — | — | — |

TABLE 7-continued

| Comparative Example No. | B1 | B2 | B3 | B4 | B5 |
|---|---|---|---|---|---|
| 2,4-dibutyl-BSA | — | — | — | — | — |
| 3,4-dipentyl-BSA | — | — | — | — | — |
| 3,4-dihexyl-BSA | — | — | — | — | — |
| p-TSA | 58 | 43 | 48 | 57 | 59 |
| o-TSA | — | — | 38 | 26 | — |
| p-EBSA | — | — | — | — | 18 |
| p-n-Butyl-BSA | 1 | 2 | 2 | 2 | — |
| Finedic | | | | | |
| M-8076 | — | — | — | — | — |
| M-8020 | — | — | — | — | — |
| A-239X | — | — | 10 | — | 10 |
| A-239Y | — | — | — | — | — |
| A-239W | — | — | — | — | — |
| M-8630 | — | — | — | — | — |
| M-8500 | — | — | — | — | — |
| Polyester Resin X | — | — | — | — | — |
| Desmophene | | | | | |
| 650 | 10 | 10 | — | 10 | — |
| 651 | — | — | — | — | — |
| Nippollan 2200 | — | — | — | — | — |
| RJ-100 | — | — | — | — | — |
| Finedic A-244 | — | — | — | — | — |
| N-cyclohexyl-p-TSA | — | — | — | — | — |
| N-phenyl-p-TSA | — | — | — | — | — |
| N-t-butyl-o-TSA | — | — | — | — | — |
| N,N-diethyl-o/p-TSA | — | — | — | — | — |
| solvent black 45 | 2 | 5 | — | — | 3 |
| solvent red 127 | — | — | — | — | — |
| solvent yellow 79 | — | — | — | 5 | — |
| solvent blue 44 | — | — | 2 | — | — |
| Blooming | | | | | |
| at RT | ⊙ | ⊙ | ⊙ | ⊙ | ⊙ |
| at 40° C. × 90 RH | X | X | X | X | X |
| Fingerprint | X | X | X | X | X |

What is claimed is:

1. In a hot-melt ink composition comprising a coloring agent and a vehicle which contains a monoalkylbenzene sulfonamide and a resin, the improvement wherein the vehicle further contains dialkylbenzene sulfonamide in an amount sufficient to increase the mechanical strength of the hot-melt ink composition.

2. A hot-melt ink composition as claimed in claim 1, wherein the vehicle comprises from 5 to 40 wt. % of the dialkylbenzenesulfonamide.

3. A hot-melt ink composition as claimed in claim 1, wherein the dialkylbenzenesulfonamide is a diC$_{1-3}$ alkylbenzenesulfonamide.

4. A hot-melt ink composition as claimed in claim 1, wherein the dialkylbenzenesulfonamide is a compound selected from the group consisting of 2,4-dialkylbenzenesulfonamides, 2,5-dialkylbenzenesulfonamides, and 3,4-dialkylbenzenesulfonamides.

5. A hot-melt ink composition as claimed in claim 1, wherein the vehicle comprises from 50 to 85 wt. % of the monoalkylbenzenesulfonamide.

6. A hot-melt ink composition as claimed in claim 1, wherein the monoalkylbezenesulfonamide comprised in the vehicle is 4- methylbenzenesulfonamide, 4-ethylbenzenesulfonamide, or mixtures thereof.

7. A hot-melt ink composition as claimed in claim 6, wherein the vehicle comprises from 20 to 60 wt. % of the 4-ethylbenzenesulfonamide.

8. A hot-melt ink composition as claimed in claim 1, wherein the composition further comprises a 4-n-C$_{3-9}$ alkylbenzenesulfonamide.

9. A hot-melt ink composition as claimed in claim 1, wherein the vehicle comprises from 5 to 15 wt. % of the resin.

10. A hot-melt ink composition as claimed in claim 1, wherein the resin has a hydroxyl number of 50 or less.

11. A hot-melt ink composition as claimed in claim 10, wherein the resin has an acid number of 10 or more.

12. A hot-melt ink composition as claimed in claim 1, wherein the resin has an acid number of 10 or more.

13. A hot-melt ink composition as claimed in claim 12, wherein the resin has a hydroxyl number of 100 or more.

14. A hot-melt ink composition as claimed in claim 1, wherein the resin has a weight-average molecular weight of 10,000 or more, and a number-average molecular weight of 3,600 or more.

15. A hot-melt ink composition as claimed in claim 1, having a shear strength of 0.2 kg/mm$^2$ or more.

16. A hot-melt ink composition as claimed in claim 1, wherein the vehicle further comprises a compound having formula (a):

$$R^3-\text{C}_6\text{H}_4-SO_2-NR^1R^2 \quad (a)$$

wherein

R$^1$ and R$^2$ each independently represent a hydrogen atom, an alkyl group having 1 to 6 carbon atoms, a 5- or 6-membered cycloalkyl group, or a phenyl group, provided that R$^1$ and R$^2$ do not represent a hydrogen atom at the same time, and R$^3$ is an alkyl group having 1 to 4 carbon atoms.

17. A hot-melt ink composition as claimed in claim 16, wherein the compound having the formula (a) is present in the vehicle in an amount of 5 wt. % or less.

18. In a hot-melt ink composition comprising a coloring agent and a vehicle which contains a monoalkylbenzene sulfonamide and a resin, the improvement wherein the composition comprises from about 10–30 weight percent of the coloring agent.

19. A composition as claimed in claim 18, wherein the vehicle further comprises a dialkylbenzene sulfonamide in an amount sufficient to increase the mechanical strength of the hot-melt ink composition.

* * * * *